United States Patent Office 2,908,550
Patented Oct. 13, 1959

2,908,550
REACTION PRODUCTS OF HYDROGEN CYANIDE AND SULFUR TRIOXIDE AND METHOD OF PREPARING SAME

Le Roi E. Hutchings, Crystal Lake, Ill., assignor to The Pure Oil Company, Chicago, Ill., a corporation of Ohio No Drawing. Application June 28, 1955
Serial No. 518,670

4 Claims. (Cl. 23—139)

This invention relates to a composition of matter and to the method for preparing the same. More particularly, the invention is directed to a polymeric reaction product of hydrogen cyanide and sulfur trioxide, and to its method of preparation.

An object of this invention is to provide a novel product.

Another object of this invention is to provide a solid reaction product of hydrogen cyanide and sulfur trioxide.

Still another object of the invention is to provide a solid product from which hydrogen cyanide and sulfur trioxide are readily available.

A further object of the invention is to provide a method for combining hydrogen cyanide and sulfur trioxide.

A still further object of the invention is to provide a method for combining hydrogen cyanide and sulfur trioxide into a solid product from which each constituent is readily available.

Other objects of the invention will appear from the following description.

I have discovered that hydrogen cyanide and sulfur trioxide will react at temperatures of about 32° F. and below to form a solid product which is stable at ordinary temperatures but which decomposes when heated to or above its melting point. The product appears to be a polymer in which HCN is joined to $SO_3$ according to the formula $xHCN.ySO_3$, in which $x$ represents a whole number more than 1 and $y$ is any whole number. In preparing the product in accordance with this invention, I prefer to react the hydrogen cyanide and sulfur trioxide in the presence of a solvent, with respect to which the reactants and the reaction product are substantially inert. Solvents which may be used are alkyl or alkylene halides, such as ethylene chloride; low boiling liquid paraffinic hydrocarbons, such as hexane; ethers such as normal butyl ether; esters such as ethyl or butyl acetate; and liquefied gases such as sulfur dioxide, ammonia and propane. Sufficient solvent is used to completely dissolve the reactants. Temperatures down to 0° F. or lower may be used and the reaction should be conducted in a dry atmosphere since the reaction product is hygroscopic.

In carrying out the preparation of the product, I prefer to dissolve each of the reactants in the solvent and cool the resulting solution to about 32° F. or below. Sulfur trioxide solution is slowly added to the cooled hydrogen cyanide solution with constant agitation, until a gummy, slightly yellowish material forms, at which point the agitation may be discontinued and the reaction mixture allowed to stand until the reaction product becomes hard and brittle. The reaction product may then be recovered from the solution by filtration in a dry atmosphere.

During the preparation of my novel composition a fine precipitate initially forms, which becomes redissolved in the reaction mixture. Thereafter, a fine white precipitate again forms in greater amount than at first, and this precipitate gradually changes in character until it becomes a gummy, slightly yellow material, indicating the point at which agitation of the reaction mixture is stopped.

As a specific illustration of the process and of the product made in accordance with my invention, 4 gram-moles of HCN (108 grams) were dissolved in 400 cc. of ethylene chloride and the resultant solution was cooled to 32° F. in an ice bath. One gram-mole of $SO_3$ (80 grams) was separately dissolved in 100 cc. of ethylene chloride and the resultant solution was slowly added to the HCN solution maintained in the ice bath while constantly stirring. A fine precipitate formed, which redissolved. After about 10 minutes of agitation a second fine white precipitate formed and continued to increase in amount. This precipitate gradually changed in character to a gummy, slightly yellow material, at which point agitation was stopped. The reaction mixture was allowed to stand until the gummy solid became hard and brittle and was recovered by filtration in a dry atmosphere. The product amounted to 95 grams. No solvent has been found in which the product is soluble.

The filtered product was stable under atmospheric conditions but was very hygroscopic. It had a melting point of approximately 160° F. and a molecular weight of about 174. The melting point was difficult to determine since decomposition of the solid began at the melting point. Analysis of the solid indicated a ratio of 7 moles of HCN to 3 moles of $SO_3$. Analysis in weight percent is as follows:

H—3.0
C—15.9
N—19.4
S—20.2
O—41.5

Although the reaction appeared to be quantitative, actual weight of material recovered was only about 50% of theoretical. Losses were accounted for by partial solubility of the product in ethylene chloride and the high volatility of HCN and $SO_3$.

The ratio of HCN to $SO_3$ in the novel composition may be somewhat dependent on the ratio of HCN to $SO_3$ in the reaction mixture, but the most probable ratio of HCN to $SO_3$ is 2–3 to 1, i.e., $(HCN)_2.SO_3$ or $(HCN)_3SO_3$, or a mixture of both.

The novel compositions are valuable as chemical intermediates where either or both HCN or $SO_3$ are required. The composition provides a convenient and effective form for introducing HCN and $SO_3$ into a reaction system. Although dissociation due to heat does not yield a 100% recovery of HCN and $SO_3$, in the event that either one or the other compound is required, the product can be heated above its melting point to bring about decomposition and separation of the $SO_3$ from the HCN. Where both substances are required in a reaction system or the presence of one only is needed and the other is not deleterious, the solid product can be introduced into the reaction system and decomposed in situ, either by heat or by reaction with one or more reactants in a system, or by both heat and reaction.

Therefore, I claim as my invention:

1. A solid polymeric reaction product of HCN and $SO_3$ having the empirical formula $7HCN.3SO_3$, produced by dissolving HCN and $SO_3$ separately in an inert organic solvent, and mixing the resulting solutions with agitation at a temperature not above about 32° F. until said solid polymeric reaction product precipitates from the solution.

2. The method of preparing a solid polymeric reaction product of HCN and $SO_3$ which comprises dissolving HCN and $SO_3$ separately in an inert organic solvent, mixing the $SO_3$ separately in an inert organic solvent, mixing the resulting solutions with agitation at a temperature not above about 32° F. until the final solid polymeric reaction product precipitates therefrom.

3. A method in accordance with claim 2 in which the solvent is ethylene dichloride.

4. A method in accordance with claim 2 in which the reactants are used in a mol ratio of HCN to $SO_3$ of about 4.

References Cited in the file of this patent

Jander et al. in "Zeitschrift für Physikalische Chemie," Band 192, pp. 204–210 (1943–44).

UNITED STATES PATENT OFFICE
CERTIFICATE OF CORRECTION

Patent No. 2,908,550                                                     October 13, 1959

Le Roi E. Hutchings

It is hereby certified that error appears in the printed specification of the above numbered patent requiring correction and that the said Letters Patent should read as corrected below.

Column 3, lines 5 and 6, strike out "mixing the $SO_3$ separately in an inert organic solvent,".

Signed and sealed this 5th day of April 1960.

(SEAL)
Attest:

KARL H. AXLINE
Attesting Officer

ROBERT C. WATSON
Commissioner of Patents